US007500073B1

(12) United States Patent
Cholleti et al.

(10) Patent No.: US 7,500,073 B1
(45) Date of Patent: Mar. 3, 2009

(54) RELOCATION OF VIRTUAL-TO-PHYSICAL MAPPINGS

(75) Inventors: Udayakumar Cholleti, Cupertino, CA (US); Sean McEnroe, North Borough, CA (US); Stan J. Studzinski, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 329 days.

(21) Appl. No.: 11/393,932

(22) Filed: Mar. 29, 2006

(51) Int. Cl.
*G06F 12/00* (2006.01)
*G06F 13/00* (2006.01)
*G06F 13/28* (2006.01)

(52) U.S. Cl. .................. 711/165; 711/170; 711/163
(58) Field of Classification Search ............... None
See application file for complete search history.

(56) References Cited

U.S. PATENT DOCUMENTS 5,765,198 A * 6/1998 McCrocklin et al. ......... 711/165
6,195,676 B1 * 2/2001 Spix et al. .................. 718/107
7,213,244 B2 * 5/2007 Chang et al. ................ 717/161

OTHER PUBLICATIONS

Eykholt et al., "*Beyond Multiprocessing . . . Multithreading the SunOS Kernel*," SunSoft, Inc., Summer '02 USENIX, Jun. 8-Jun. 12, 1992, San Antonio, Texas.
Sun Microsystems Computer Company, "*The Solaris Memory System*," Sizing, Tools and Architecture, May 1998.
FreeBSD Documentation: Developers Handbook, "*14.6 Bus memory mapping*,", Jun. 2004 http://freebsd.active-venture.com/arch-handbook/isa-driver-busmem.html.
Sun Microsystems, Inc., "*Solaris Memory Architecture*," Aug. 2000.
Jim Mauro, "*Swap space implementation, part one*," Sun World, Dec. 1997, http://sunsite.uakom.sk/sunworldonline/swol-12-1997/swol-12-insidesolaris.html.

* cited by examiner

*Primary Examiner*—Reginald G Bragdon
*Assistant Examiner*—Baboucarr Faal
(74) *Attorney, Agent, or Firm*—Marine Penilla & Gencarella, LLP

(57) ABSTRACT

A method for relocating virtual to physical memory mappings in a computer system is described in which a new hardware mapping entry (HME) block is allocated at a new location in memory. Contents of an old HME block are copied to the new HME block. The new HME block is added to a linked list of HME blocks. The old HME block is then removed from the linked list. A lock is acquired during the adding and during the removing. A machine readable medium having processor instructions for relocating virtual to physical memory mappings is also described.

20 Claims, 4 Drawing Sheets

RELOCATION OF VIRTUAL-TO-PHYSICAL MAPPINGS

BACKGROUND

Modern computers provide each process being executed in a computer system its own virtual address space. This allows memory to be dynamically allocated to each running process while at the same time providing all the running processes with contiguous address space. The computer operating system and hardware work together to map each virtual address for each process to a unique physical address thereby making the appropriate location in memory available when needed by a process. The operating system kernel stores this mapping data in page tables in the main memory.

Relocation of data from one physical memory location to another is sometimes necessary. For example, if one memory board begins to fail, it might be desirable to replace it. However, traditionally, for a variety of reasons, virtual-to-physical mapping data has been designated as non-relocatable (NR) and stored along with other non-relocatable data as designated by the operating system.

When a failing memory board contains data that is considered non-relocatable (NR), special measures must be taken. Often, the system is simply shut down, the memory board swapped out and the system restarted. This is undesirable for obvious reasons, such as the down-time of the system. NR data could also be relocated using a hardware based copy-rename algorithm. In this case, all devices attached to the system are suspended, all CPUs are paused, the entire memory is copied from the old source board to the new destination board, and the physical addresses on the new board are reprogrammed to be the same as those on the old board which is to be removed. The old board is then deactivated and the system resumed.

Hardware copy-rename has severe limitations. First, since it pauses all the remaining CPUs and suspends all devices, system performance is drastically affected. Thus, it is only used while removing the board on which operating system (OS) kernel memory is placed. Second, copy-rename requires all the kernel memory including the kernel/user stacks to be allocated on the minimum number of boards. Otherwise, it may not be possible to reprogram the new board with the physical addresses of the old board. All NR data is therefore allocated on the minimum number of boards. As a result, threads running on all CPUs access the same memory board (s), which may be remote from the CPUs, whenever the mapping data is accessed. This increases memory latency and bus traffic and thus affects the scalability of large servers.

It would be desirable to provide a mechanism to relocate virtual-to-physical mapping data without significantly affecting system availability. This would allow the mapping data to be initialized at a physical location closer to the processor requesting memory, which would improve memory latency while servicing a translation lookaside buffer (TLB) miss or pagefault. In addition, it would reduce the amount of NR memory required by the kernel. In addition, by not having to allocate static buffers in the NR memory for holding the virtual-to-physical mappings during boot, initialization time would be decreased.

SUMMARY

Broadly speaking, the present invention fills these needs by providing an method for relocating virtual-to-physical mapping data without suspending or shutting down the system.

It should be appreciated that the present invention can be implemented in numerous ways, including as a process, an apparatus, a system, a device, or a method. Several inventive embodiments of the present invention are described below.

In one embodiment, a method for relocating virtual to physical memory mappings in a computer system is described in which a new hardware mapping entry (HME) block is allocated at a new location in memory. Contents of an old HME block are copied to the new HME block. The new HME block is then added to a linked list of HME blocks. The old HME block is then removed from the linked list. A lock is acquired during the adding and during the removing.

In another embodiment, a computer readable medium is provided that has processor instructions for relocating virtual to physical memory mappings. The computer readable medium includes processor instructions for copying contents of an old HME block to the new HME block, processor instructions for adding the new HME block to a linked list of HME blocks, and processor instructions for removing the old HME block from the linked list. A lock is acquired during the adding and during the removing.

Other aspects of the present invention will become apparent from the following detailed description, taken in conjunction with the accompanying drawings, illustrating by way of example the principles of the invention.

DETAILED DESCRIPTION

Figure 1:
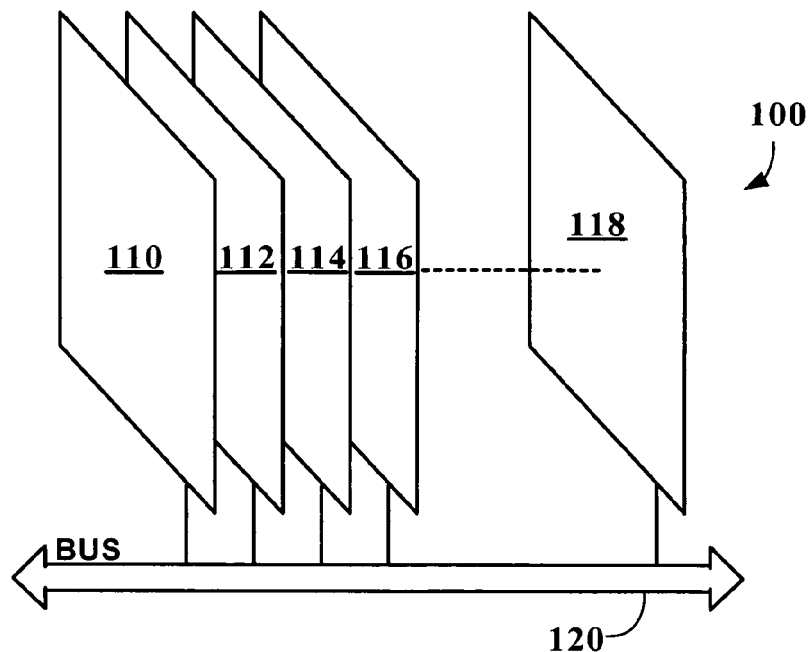
FIG. 1 shows an exemplary computer system on which the disclosed embodiments can be implemented.

Memory management is a key task of most computer operating systems (OS). In large server systems, it is occasionally necessary to move data from one memory board to another, or from one physical location to another in a distributed network. FIG. 1 shows an exemplary computer system 100 having a plurality of circuit boards 110-118 in communication via bus 120. Circuit boards 110-118 may be located in one location, or may be distributed across a network. Each circuit board typically includes a CPU and physical memory, such as RAM stored in solid-state circuitry. Some circuit boards may have memory only and no CPU. It is also possible to have a CPU separate from memory.

Each memory location on each board is assigned an address according to a memory-naming scheme. Ordinarily, the physical memory is organized in pages having some selected page size, and each page is assigned a page frame number (PFN). To access the physical memory, the OS and hardware work together to translate virtual memory addresses known by processes into physical memory addresses so that data will be stored in a known physical location and thus desired data stored in the memory can be retrieved.

Computer system 100 has multiple processors and may have a plurality of threads running concurrently in one or more of the processors. Each thread is assigned space in the memory as it is aggregated throughout the system, and some threads may share physical memory with other threads.

Figure 2:
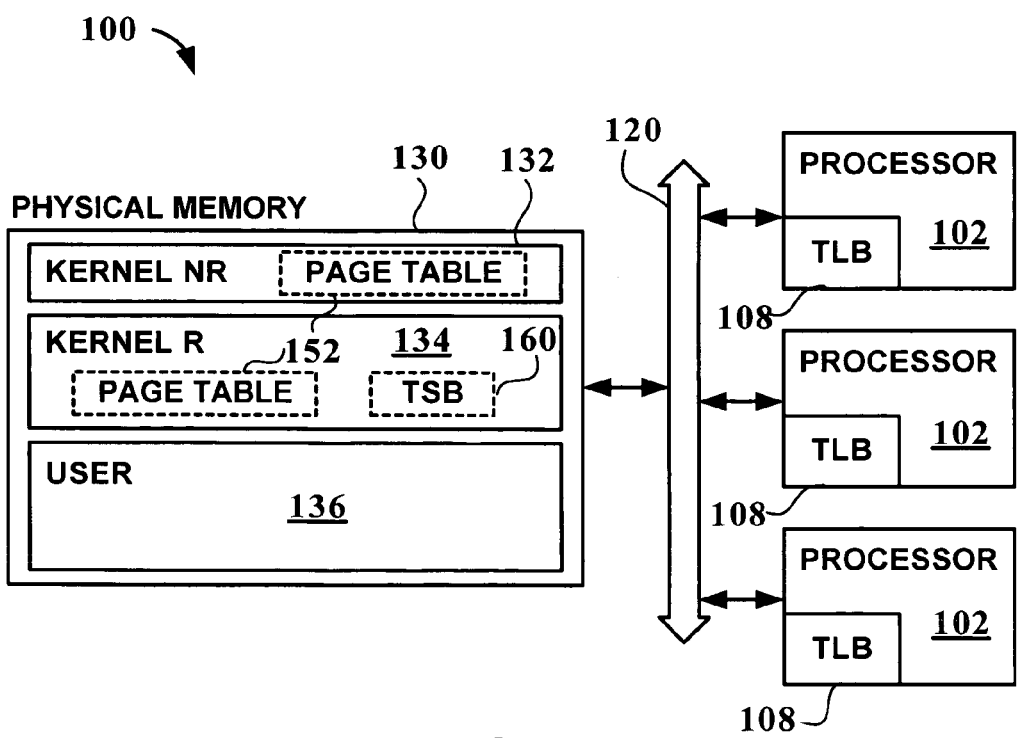
FIG. 2 shows another view of the exemplary computer system shown in FIG. 1.

FIG. 2 shows another representation of computer system 100. Specifically, computer system 100 includes processors 102 and physical memory 130. To translate virtual addresses into a physical memory address, a variety of means including translation lookaside buffers (TLB) 108, translation storage buffers (TSB) 160, and page table 152. In one embodiment, translation storage buffer resides in relocatable kernel memory 134 and portions of the page table 152 reside in either the non-relocatable kernel memory 132 and relocatable kernel memory 134.

Each processor 102 contains at least one TLB, which may be shared between any number of processing cores. The TLB is very fast content-addressable memory and acts as a high speed cache for virtual-to-physical address mapping data. Each entry in the TLB is a translation table entry (TTE). As will be described below in further detail, each TTE contains a tag and a PFN. The tag includes an address space identifier (AS) identifying a process for which the PFN is valid and a plurality of flags. The PFN is the physical address corresponding to the given virtual address (VA) and process identifier, also referred to as the address space (AS).

Translation is performed by a combination of hardware and software processes. When a user process allocates memory, space is created in that user's virtual address space by the kernel. When the user then touches this virtual memory location, the processor executing the process will search the TLB for a TTE corresponding to the virtual address (VA) allocated which will then give a corresponding PFN. The TLB will signal a cache miss since it does not contain a TTE for the new VA. The kernel will then check the TSB to see if it contains a valid TTE for the new VA. The TSB contains a data structure for each running process and holds many more TTEs than the TLB. It should be noted that not all systems maintain a TSB in which case the kernel will access the page table directly when a TLB cache miss occurs. In the present example, where there is a TSB, the kernel checks the TSB before searching the page table. If the TTE is found in the page table, it is copied to the TSB and TLB (or just the TLB if the system does not provide a TSB). If the TTE is not found, that generates a pagefault, which could result in allocating physical memory and generating a mapping to the VA.

Figure 3:
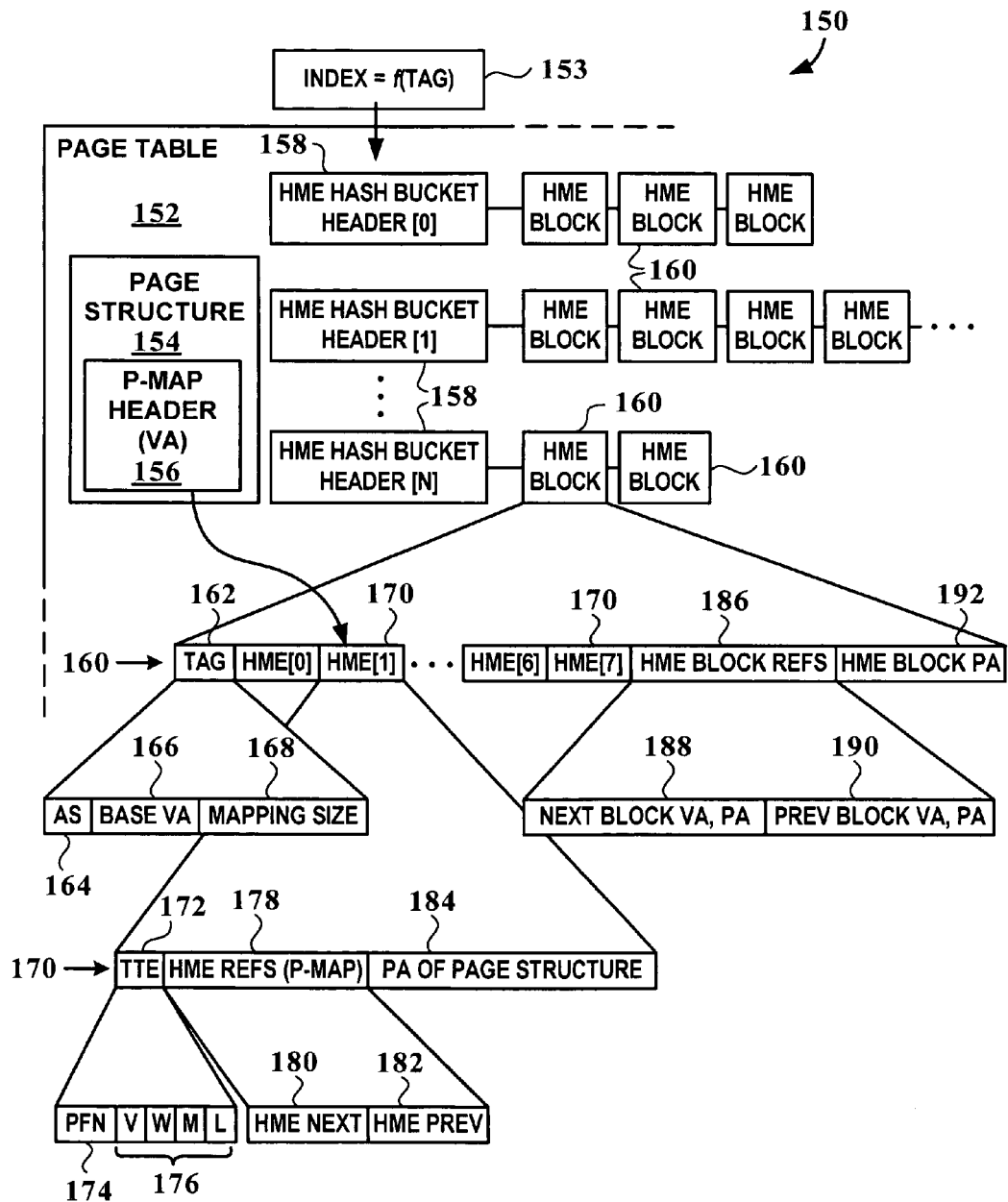
FIG. 3 shows a schematic representation of a page table data structure for storing virtual-to-physical mappings.

FIG. 3 shows a schematic representation of a page table data structure 150 for mapping virtual-to-physical addresses. In this example, to find a mapping for a particular VA, the kernel will first determine a hash bucket header index by running a hashing function 153 on a tag 162, which contains known values. Tag 162 contains the AS 164, the base VA 166, and the mapping size 168. As mentioned above, the AS is an identifier of the process waiting for the address translation. The base VA 166 is the VA with a number of the least significant digits set to zero. The mapping size 168 is the page size used by the particular process. These values are input into hashing function 153 that returns a hash bucket header index value. This index value identifies one of hash bucket headers 158 in page table 152. Each hash bucket header contains a virtual and physical address of a first hardware mapping entry (HME) block 160 in a linked list of HME blocks. Each HME block 160 includes HME block references 186. HME block references 186 include next HME block pointer 188 and previous block pointers 190, each containing virtual and physical addresses pointing to the next and previous HME blocks 160 in the linked list.

To find a PFN for a given VA, the linked list of HME blocks 160 is traversed and the Base VA 166 is checked to see if it matches the significant digits of the given VA. If not, then the next HME block pointer 188 is checked. If it is not null, then the next HME block in the linked list is accessed using the next HME block pointer 188.

Each HME block 160 has a number of HMEs 170. In one embodiment, each HME block 160 has eight HMEs 170 numbered zero through seven. Each HME 170 contains a TTE 172 which is copied to the TSB and TLB. The TTE 172 contains a PFN 174 to identify the location in physical memory corresponding a given VA. In addition, a number of flags 176 are provided. In this embodiment, flags 176 include V, W, M, and L, corresponding to valid, writeable, modified, and locked, respectively. Persons skilled in the art will recognize the significance of these flags, the details of which need not be described here.

If, while traversing an HME block linked list, an HME block 160 is found with a Base VA 166 matching the significant digits of the VA, then the appropriate HME 170 in that HME block 160 is identified. The appropriate HME 170 in the HME block 160 is located by multiplying the least significant digits of the VA by the size of each HME 170 and adding the resultant product to the address of the first HME 170 in the HME block 160. Thus, the VA assigned to each HME 170 is Base VA 166 plus the HME index number. In exemplary embodiments, the mapping size may vary and can be defined differently for each process. Typical mapping sizes are 8 KB to 1 MB or more, depending on the application. The mapping size determines how many individual addresses each TTE can translate, and thus represents the smallest block of physical memory that can be allocated to a process.

If the kernel comes to the end of a linked list, identified by a null next HME block reference 188, or TTE 174 is null when a correct HME block is located, then the page table has no PFN or physical memory assigned to the given VA. In this case, a page fault occurs and a trap handler is invoked so that physical memory can be assigned to the VA and an HME created, and if necessary a new HME block is allocated.

There are times when it is useful to identify all the processes that utilize a particular physical page. For example, a page out deamon (not shown) will want to identify all the virtual addresses corresponding to a particular physical page when exiting a program so that the physical addresses can be freed and then used by other processes. To do so, the kernel can access the page structure 154 in page table 152 that corresponds to the particular physical page. Thus, each physical page has a page structure 154 containing various parameters relating to that location in memory. One parameter is the p-map header 156, which is a pointer to a virtual address of the first HME 170 that contains a particular PFN 174. Each HME contains HME references 178 that identify additional HMEs in a p-map linked list of HMEs that relate to the particular PFN. HME references 178 include HME next pointer 180 and HME previous pointer 182. Thus, all the processes that share a space in physical memory can be identified by reading AS 164 from the HMEs in the p-map linked list. The p-mapping is maintained by the page fault handler so that when it creates a new HME, it places it into the p-map list for the corresponding page structure 154. In addition, it should be noted that each HME 160 contains page pointer 184 containing the physical address of the page structure 154 corresponding to the process identified by the AS 164 of that HME 160, for reasons that will be made clear below.

In one embodiment, the kernel maintains three types of locks (not shown) with regard to page table data structure 150. These include an HME hash bucket lock, a p-map list lock, and a spin lock. The HME hash bucket lock is generally applied when traversing the linked list and when modifying, adding or removing HME blocks. The HME hash bucket lock is an adaptive lock, so-called because the behavior of a blocked thread can adapt (spin or sleep) depending on whether the lock owner is running. Ownership of this lock is required for traversing the linked list so as to prevent others from altering the linked list. In one embodiment, each HME hash bucket lock is shared by a number of HME hash buckets. For example, each HME hash bucket lock may comprise a seven-bit lock value that applies to all HME hash buckets having an index value having least significant seven bits in common with the seven-bit lock value.

The p-map list lock operates in a manner similar to the hash bucket lock, but the p-map list lock is acquired when traversing or modifying the p-mapped linked list of HMEs. As with the HME hash bucket lock, there may be only 128 or 256 p-map list locks. The lock for a particular p-map linked list is identified using a hash function of the page pointer 184.

The spin lock is acquired only immediately before an HME block is added, modified, or removed, and then it is immediately released. A spin lock is a lock that causes a process seeking to obtain the lock to spin in a loop until the lock is released. The spin lock protects the TSB miss handlers, which only access the hash buckets when trying to read a TTE 172 so that it can be loaded into the TSB and TLB. Since the TSB miss handlers only read the HMEs and do not modify them, TSB miss handlers are not required to acquire the adaptive HME hash bucket lock when traversing. Instead, the TSB miss handler only obtains the spin lock to ensure that an HME block is not added or removed while traversing the linked list.

In one embodiment, the spin lock is a global 8-bit value wherein 0x00 means it is clear and 0xFF means it is set. If the spin lock is clear, the TSB (or TLB, if no TSB) miss handler will set it and traverse the list. If another thread wants to add or delete an HME block from the hash bucket, it needs to acquire two locks: the adaptive hash bucket lock and the spin lock. The HME hash bucket lock is sufficient when traversing, but the spin lock is necessary when actually removing (or adding) the HME block. This ensures that the TSB miss handler is not currently traversing the hash bucket linked list. If the lock is already set, the thread continues trying until it is set to zero, then sets it to one, and proceeds to add or delete the HME block. Once the HME block is added or deleted, the spin lock is immediately released.

Figure 4:
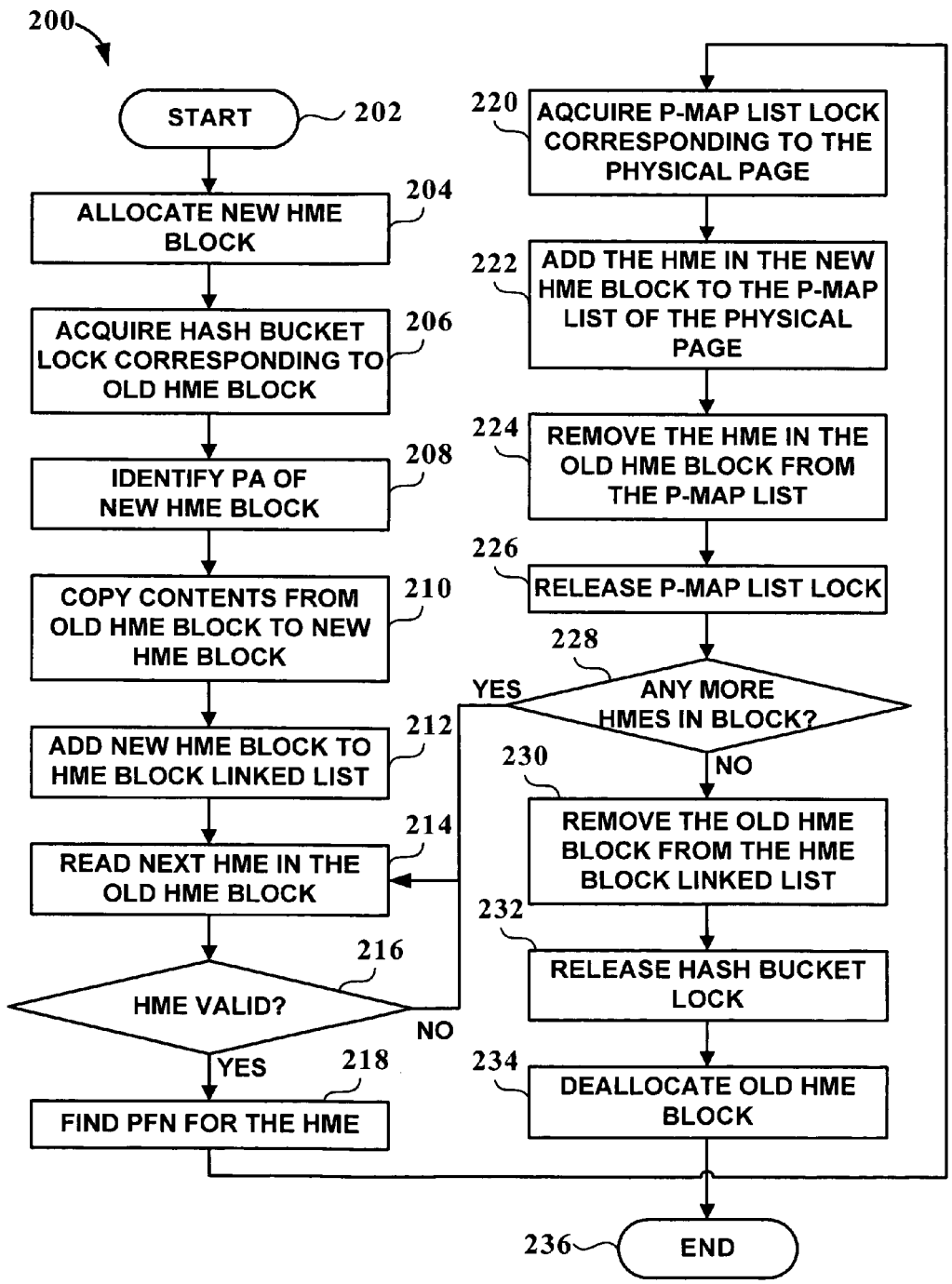
FIG. 4 shows a flowchart depicting an exemplary procedure for relocating virtual-to-physical memory mappings.
Figure 5:
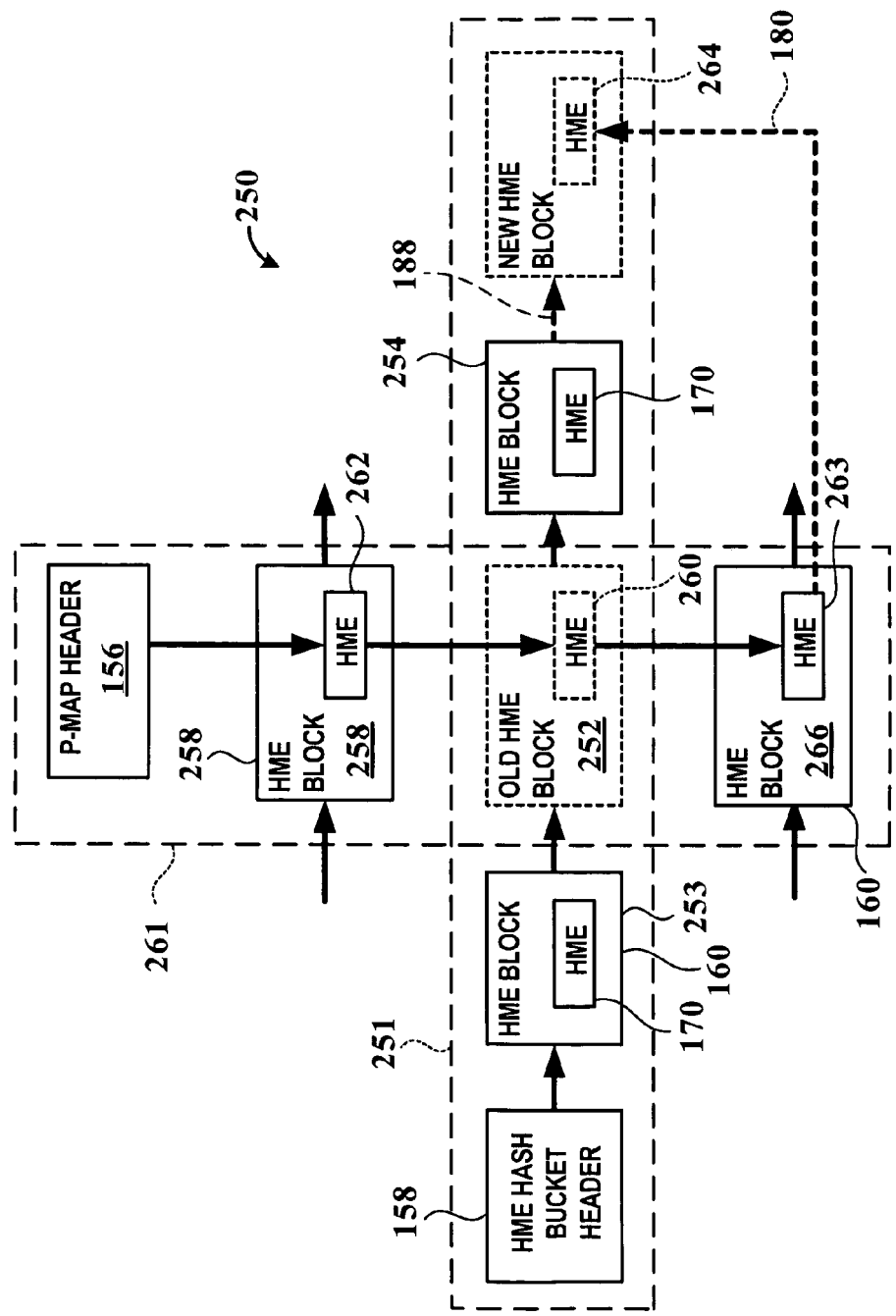
FIG. 5 shows a partial exemplary hash table illustrating the procedure of FIG. 4.

FIG. 4 shows a flowchart 200 depicting an exemplary procedure for moving an HME block from one physical location to another. This procedure assumes that the existing HME block that is desired to be moved is known. As mentioned previously, the ability to relocate HME blocks permits dynamic reallocation of memory; allowing HME blocks to live closer to the processor that accesses them most. In addition, if a memory board is generating errors, the data can be moved to a different memory board. Flowchart 200 will be described with reference to FIG. 5, which illustrates the procedure described by flow chart 200 in FIG. 4. FIG. 5 shows an exemplary HME block linked list 251 comprising a linked list of HME blocks stemming from HME hash bucket header 158. Each HME block has at least one HME (only one shown for each). Reference numbers starting with 250 will be used to indicate particular HME blocks or HMEs in FIG. 5. In exemplary procedure depicted in flowchart 200 in FIG. 4, a new HME block 256 is allocated in a desired place in kernel memory, and an old HME block 252 is deleted. The old HME block 252 includes adjacent HME blocks 253 and 254 in HME block linked list 251. In addition, each HME 260 (only one shown) of HME block 252 is part of a p-map linked list 261 and has adjacent HMEs 262 and 263. In accordance with the exemplary method, new HME block 256 is instantiated in HME block linked list 251 and p-map linked list 261.

Referring now to FIG. 4, the exemplary procedure begins as indicated at start block 202 and flows to operation 204 wherein a new HME block 256 (FIG. 5) is allocated. New HME block 256 may, for example, be allocated from kernel memory, and may be in non-relocatable kernel memory 132 or relocatable kernel memory 134 (FIG. 2). When new HME block 256 is allocated, the field containing its physical address, HME block PA 192 (FIG. 3) is initialized with the physical address of the HME block. The procedure then flows to operation 206.

In operation 206, a hash-bucket lock corresponding to the old HME block is acquired. To obtain the hash bucket lock, the tag 162 (FIG. 3) of the old HME block is read and input into hashing function 153 (FIG. 3) to determine the hash bucket header index value. Once the index value is known, a lock can be placed on that hash bucket. The procedure then flows to operation 208.

In operation 208, the PA of new HME 256 block is identified. The PA is known at the time of allocating the new HME block and is also stored in the new HME block as HME block PA 192 (FIG. 3). In one embodiment, the PA is pushed onto the kernel stack. The procedure then flows to operation 210.

In operation 210, the contents of old HME block 252 is copied to the HME block 256. In one embodiment, the PA obtained in operation 208 is used as the target address for copying the HME block 252. The physical address pointer 192 (FIG. 3) of new HME block 256 is not over-written when copying, or else it is rewritten after data from old HME block 252 is copied over. The procedure then flows to operation 212

In operation 212, new HME block 256 is added to the HME block linked list 251. In one embodiment, new HME block 256 is added at the end of linked list 251. Thus, any process traversing the linked list will encounter old HME block 252 first. Specifically, next HME block pointer 188 (FIG. 3) of what was the last HME block in linked list 251, HME block 254, is modified from the null value (which indicates it is the last HME block) to the VA and PA of new HME block 256. Likewise, the previous HME block pointer 190 (FIG. 3) of new HME block 256 is modified to point to HME block 254, and the next HME block pointer 188 of new HME block 256 is made null. The spin lock mentioned above is acquired immediately before and is released immediately after adding new HME block 256 to the linked list 251. The procedure then flows to operation 214.

In operation 214, the next HME (or first HME, if no previous) is read in the old HME block. Each HME in the HME block is therefore considered in series. For purposes of this description, HME 260 will be referred to as the "old current HME" and HME 264 as the corresponding "new current HME." After reading the next HME in the old HME block 252, the procedure flows to operation 216.

In operation 216, it is determined whether the valid bit V in flags 176 (FIG. 3) indicates that the old current HME 260 is valid. If the valid bit indicates an invalid HME, then the procedure flows back to operation 214 to read the next HME in old HME block 252. However, if the HME is valid, then the procedure flows to operation 218.

In operation 218, the PFN 174 (FIG. 3) of old current HME 260 is identified. After identifying the physical address of the old current HME, the procedure flows to operation 220.

In operation 220, the p-map list lock is acquired. The p-map list lock is acquired using a hashing function of the PFN identified in operation 218. The p-map list lock prevents other processes from traversing or manipulating p-map linked list 261 while the lock is acquired. The procedure then flows to operation 222.

In operation 222, new current HME 264 is added to the p-map linked list 261. In one example, new current HME 264 is added at the end of p-map linked list 261. Specifically, HME next pointer 180 of the last HME in p-map linked list 261, HME 263, is modified from null to the VA of new current HME 264. Likewise, HME previous pointer 182 of new current HME 264 is modified to the VA of HME 263 and HME next pointer 180 of new current HME 264 is set to null. After adding new current HME 264 to p-map linked list 261, the procedure flows to operation 224.

In operation 224, the old current HME 260 is removed from p-map linked list 261. Specifically, the next and previous HME pointers 180, 182 of the old current HME 260 are copied to respective of the previous and next HMEs 262, 263 in p-map linked list 261. After removing old current HME 260 from p-map linked list 261, the procedure flows to operation 226.

In operation 226, the p-map list lock is released. The procedure then flows to operation 228.

In operation 228, it is determined whether there are any more HMEs in old HME block 252. If there is another HME, then the procedure flows back to operation 214 to read the next HME in old HME block 252. If there are no more HMEs, then the procedure flows to operation 230.

In operation 230, old HME 252 is removed from linked list 251. In this operation, HME block refs 186 of the old HME block 252 are copied to corresponding fields in previous and next HME blocks 253, 254 in HME linked list 251. The spin lock is acquired immediately before and is released immediately after removing old HME block 252 from linked list 251. After removing old HME 252 from HME block linked list 251, the procedure flows to operation 232.

In operations 232 and 234, the hash bucket lock is released and the old HME block 252 is de-allocated. After the old HME block is de-allocated, the procedure ends as indicated by ending block 236.

The algorithm described above blocks TSB or TLB misses only during operations 212 and 224. This is accomplished by providing a separate lock, the spin lock, that needs to be acquired while adding or removing an HME block. Since TLB and/or TSB misses are blocked only during very short periods of time, the algorithm is very efficient.

The algorithm described above allows page tables to be allocated on all memory boards while retaining the functionality of dynamic memory reconfiguration. This improves memory latency when servicing TLB misses and pagefaults. This algorithm also makes it possible to relocate a data from a memory board that holds page tables, e.g., when the board encounters hardware-related errors.

Embodiments of the present invention can be processed on a single computer, or using multiple computers or computer components which are interconnected. A computer, as used herein, shall include a standalone computer system having its own processor, its own memory, and its own storage, or a networked terminal. In some distributed computing systems, users of a computer system may actually be accessing component parts that are shared among a number of users. The users can therefore access a virtual computer over a network, which will appear to the user as a single computer customized and dedicated for a single user.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for relocating virtual to physical memory mappings in a computer system, the method comprising:
    allocating a new hardware mapping entry (HME) block at a new location in memory;
    copying contents of an old HME block to the new HME block, wherein the old and the new HME blocks are part of a linked list of HME blocks within a hash bucket header in a page table with each HME block comprising a linked list of HMEs, the copying of contents including providing a first lock on the old and the new HME block;
    adding the new HME block to the linked list of HME blocks;
    copying the linked list of HMEs from the old HME block to the new HME block by providing a second lock corresponding to a physical page identified by the corresponding HME;
    releasing the second lock for the HMEs on the physical page after successful copying of the linked list of HMEs;
    removing the old HME block from the linked list; and
    releasing the first lock on the old and the new HME block, wherein the first and second locks ensuring contents in both the HME block and the HMEs within the HME block are locked for a period sufficient enough to copy the HMEs and the corresponding HME block from the old location to the new location.

2. The method of claim 1, further including a third lock, the third lock acquired is a spin lock, the spin lock being acquired immediately before and released immediately after each of the adding of the new HME block and the removing of the old HME block, the spin lock causing a thread seeking to obtain the lock to spin in a loop until the spin lock is released.

3. The method of claim 1, wherein the first lock is a hash bucket lock.

4. The method of claim 3, wherein the hash bucket lock is an adaptive lock, the adaptive lock allowing a blocked thread seeking to obtain the lock to sleep while an owner of the lock is running.

5. The method of claim 1, further comprising:
   for each valid one of the HMEs in the old HME block, adding a corresponding HME in the new HME block as part of a p-map linked list for a physical page identified by the corresponding HME; and
   removing the HME from the p-map linked list in the old HME block while the second lock is in place for the corresponding HMEs on the physical page.

6. The method of claim 5, wherein the second lock acquired is a p-map list lock during the adding of the corresponding HME in the new HME block and during the removing of the HME from the old HME block.

7. The method of claim 5 wherein the corresponding HME is added in the new HME block after a last HME in the p-map linked list.

8. The method of claim 1 wherein the new HME block is allocated in movable kernel memory.

9. The method of claim 1 wherein the new HME block is added to the linked list of HME blocks after a last HME block in the linked list of HME blocks.

10. The method of claim 1 further comprising deallocating the old HME block after the releasing of the first lock.

11. A computer readable medium having processor instructions embedded on a data storage device which when read by a computing system causes the computing system to perform a method for relocating virtual to physical memory mappings, the method comprising:
    allocating a new hardware mapping entry (HME) block at a new location in memory;
    copying contents of an old HME block to the new HME block, wherein the old and the new HME blocks are part of a linked list of HME blocks within a hash bucket header in a page table with each HME block comprising a linked list of HMEs, the copying of contents including providing a first lock on the old and the new HME block;
    adding the new HME block to the linked list of HME blocks;
    copying the linked list of HMEs from the old HME block to the new HME block by providing a second lock corresponding to a physical page identified by the corresponding HME;
    releasing the second lock for the HMEs on the physical page after successful copying of the linked list of HMEs;
    removing the old HME block from the linked list; and
    releasing the first lock on the old and the new HME block, wherein the first and second locks ensuring contents in both the HME block and the HMEs within the HME block are locked for a period sufficient enough to copy the HMEs and the corresponding HME block from the old location to the new location.

12. The computer readable medium of claim 11, further including a third lock, the third lock acquired is a spin lock, the spin lock being acquired immediately before and released immediate after each of the adding of the new HME block and the removing of the old HME block, the spin lock causing a thread seeking to obtain the lock to spin in a loop until the spin lock is released.

13. The computer readable medium of claim 11, wherein the first lock is a hash bucket lock.

14. The computer readable medium of claim 13, wherein the hash bucket lock is an adaptive lock, the adaptive lock allowing a blocked thread seeking to obtain the lock to sleep while an owner of the lock is running.

15. The computer readable medium of claim 11, further comprising:
    for each valid one of the HMEs in the old HME block, adding a corresponding HME in the new HME block as part of a p-map linked list for a physical page identified by the corresponding HME; and
    removing the HME from the p-map linked list in the old HME block while the second lock is in place for the corresponding HMEs on the physical page.

16. The computer readable medium of claim 15, wherein the second lock acquired is a p-map list lock during the adding of the corresponding HME in the new HME block and during the removing of the HME from the old HME block.

17. The computer readable medium of claim 15 wherein the corresponding HME is added in the new HME block after a last HME in the p-map linked list.

18. The computer readable medium of claim 11, wherein the new HME block is allocated in movable kernel memory.

19. The computer readable medium of claim 11, wherein the new HME block is added to the linked list of HME blocks after a last HME block in the linked list of HME blocks.

20. The computer readable medium of claim 11, further comprising deallocating the old HME block after the releasing of the first lock.

* * * * *